US011610388B2

(12) United States Patent
Mao et al.

(10) Patent No.: US 11,610,388 B2
(45) Date of Patent: Mar. 21, 2023

(54) METHOD AND APPARATUS FOR DETECTING WEARING OF SAFETY HELMET, DEVICE AND STORAGE MEDIUM

(71) Applicant: BEIJING BAIDU NETCOM SCIENCE TECHNOLOGY CO., LTD., Beijing (CN)

(72) Inventors: Mingyuan Mao, Beijing (CN); Yuan Feng, Beijing (CN); Ying Xin, Beijing (CN); Pengcheng Yuan, Beijing (CN); Bin Zhang, Beijing (CN); Shufei Lin, Beijing (CN); Xiaodi Wang, Beijing (CN); Shumin Han, Beijing (CN); Yingbo Xu, Beijing (CN); Jingwei Liu, Beijing (CN); Shilei Wen, Beijing (CN); Hongwu Zhang, Beijing (CN); Errui Ding, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 200 days.

(21) Appl. No.: 17/164,613

(22) Filed: Feb. 1, 2021

(65) Prior Publication Data
US 2021/0224526 A1 Jul. 22, 2021

(30) Foreign Application Priority Data
Sep. 25, 2020 (CN) .......................... 202011027004.0

(51) Int. Cl.
G06V 10/44 (2022.01)
G06T 7/73 (2017.01)
(Continued)

(52) U.S. Cl.
CPC ............ *G06V 10/454* (2022.01); *G06F 18/22* (2023.01); *G06N 3/08* (2013.01); *G06T 7/75* (2017.01);
(Continued)

(58) Field of Classification Search
None
See application file for complete search history.

(56) References Cited

U.S. PATENT DOCUMENTS

2016/0292520 A1* 10/2016 Takahashi .............. G06V 40/20
2020/0074678 A1* 3/2020 Ning ........................ G06T 7/75
(Continued)

OTHER PUBLICATIONS

Long et al ("Safety Helmet earing Detection Based on Deep Learning", 2019 IEEE 3rd Information Technology, Networking, Electronic and Automation Control Conference (ITNEC), Mar. 15-17, 2019, DOI: 10.1109/ITNEC.2019.8729039, pp. 2495-2499 (Year: 2019).*

Primary Examiner — Leon Viet Q Nguyen
(74) Attorney, Agent, or Firm — J.C. Patents

(57) ABSTRACT

The present application discloses a method and an apparatus for detecting wearing of a safety helmet, a device and a storage medium. The method for detecting wearing of a safety helmet includes: acquiring a first image collected by a camera device, where the first image includes at least one human body image; determining the at least one human body image and at least one head image in the first image; determining a human body image corresponding to each head image in the at least one human body image according to an area where the at least one human body image is located and an area where the at least one head image is located; and processing the human body image corresponding to the at least one head image according to a type of the at least one head image.

20 Claims, 8 Drawing Sheets

(51) Int. Cl.
  *G06N 3/08* (2023.01)
  *G06V 40/10* (2022.01)
  *G06V 20/52* (2022.01)
  *G06F 18/22* (2023.01)
  *G06V 10/764* (2022.01)
  *G06V 10/778* (2022.01)
  *G06V 10/82* (2022.01)

(52) U.S. Cl.
  CPC ........ *G06V 10/764* (2022.01); *G06V 10/7788* (2022.01); *G06V 10/82* (2022.01); *G06V 20/52* (2022.01); *G06V 40/10* (2022.01); *G06T 2207/20081* (2013.01); *G06T 2207/30196* (2013.01)

(56) References Cited

U.S. PATENT DOCUMENTS

2020/0349704 A1* 11/2020 Pang ................. G06T 5/003
2022/0058381 A1*  2/2022 Ionescu ............. G06V 10/454

* cited by examiner

METHOD AND APPARATUS FOR DETECTING WEARING OF SAFETY HELMET, DEVICE AND STORAGE MEDIUM

CROSS-REFERENCE TO RELATED APPLICATIONS

This application claims priority to Chinese Patent Application No. 202011027004.0, filed on Sep. 25, 2020, which is hereby incorporated by reference in its entirety.

TECHNICAL FIELD

Embodiments of the present application relate to the technical field of artificial intelligence, specifically deep learning, cloud computing, and computer vision, and in particular, to a method and an apparatus for detecting wearing of a safety helmet, a device and a storage medium.

BACKGROUND

At present, workers working in construction sites usually need to wear safety helmets, so as to reduce injuries to the workers caused by an object falling from high altitude or an object strike in the construction sites.

Due to low safety awareness of some workers, cameras are installed in the construction sites, construction video images are collected by the cameras, and monitoring staffs observe the construction video images to determine whether the workers are wearing safety helmets. In the above method, when the monitoring staffs are relied on to observe the construction video images to determine whether the workers are wearing safety helmets, manpower of the monitoring staffs would be wasted. Furthermore, when the monitoring staffs observe the construction video images, some of the construction video images may be missed, resulting in poor effectiveness of construction monitoring.

SUMMARY

The present application provides a method and an apparatus for detecting wearing of a safety helmet, a device and a storage medium.

According to a first aspect of the present application, a method for detecting wearing of a safety helmet is provided, which includes:

acquiring a first image collected by a camera device, where the first image includes at least one human body image;

determining the at least one human body image and at least one head image in the first image;

determining a human body image corresponding to each head image in the at least one human body image according to an area where the at least one human body image is located and an area where the at least one head image is located; and processing the human body image corresponding to the at least one head image according to a type of the at least one head image.

In a possible design, the determining the at least one human body image and at least one head image in the first image includes:

processing the first image by a first model to obtain the at least one human body image and the at least one head image, where the first model is obtained by learning a plurality of sets of samples, and each set of samples includes a sample image, a sample human body image and a sample head image.

In a possible design, the processing the first image by a first model to obtain the at least one human body image and the at least one head image include:

performing deformable convolution processing on the first image by the first model to obtain image feature information; and performing processing on the image feature information by the first model to obtain the at least one human body image and the at least one head image.

In a possible design, the determining a human body image corresponding to each head image in the at least one human body image according to an area where the at least one human body image is located and an area where the at least one head image is located includes:

acquiring matching degree between the area where the at least one head image is located and the area where each human body image is located;

determining the human body image corresponding to each head image in the at least one human body image according to the matching degree corresponding to each head image.

In a possible design, for a first head image in the at least one head image, determining a human body image corresponding to the first head image in the at least one human body image according to matching degree corresponding to the first head image, which includes:

determining first matching degree in the matching degree corresponding to the first head image; and determining a human body image corresponding to the first matching degree to be the human body image corresponding to the first head image.

In a possible design, processing human body image corresponding to the first head image according to a type of the first head image, which includes:

adding a label in the first image according to the type of the first head image, where the label is used to indicate the human body image corresponding to the first head image;

where, the type of the first head image is a first type or a second type, the first type is used to indicate that the first head image includes a safety helmet image, and the second type is used to indicate that the first head image does not include the safety helmet image.

In a possible design, the adding a label in the first image according to the type of the first head image includes:

adding a first label in the first image, when the type of the first head image is the first type; and/or adding a second label in the first image, when the type of the first head image is the second type.

In a possible design, after the processing the human body image corresponding to the at least one head image according to a type of the at least one head image, the method further includes:

sending an alarm instruction to an alarm device, where the alarm instruction instructs the alarm device to perform an alarm operation.

In a possible design, the first image is an image collected by the camera device in a preset area.

According to a second aspect of the present application, an apparatus for detecting wearing of a safety helmet is provided, which includes: an acquiring module, a determining module and a processing module; where, the acquiring module is configured to acquire a first image collected by a camera device, where the first image includes at least one human body image;

the determining module is configured to determine at least one human body image and at least one head image in the first image;

the determining module is further configured to determine a human body image corresponding to each head image in the at least one human body image according to an area where the at least one human body image is located and an area where the at least one head image is located; and the processing module is configured to process the human body image corresponding to the at least one head image according to a type of the at least one head image.

In a possible design, the determining module is specifically configured to:

process the first image by a first model to obtain the at least one human body image and the at least one head image, where the first model is obtained by learning a plurality of sets of samples, and each set of samples includes a sample image, a sample human body image and a sample head image.

In a possible design, the determining module is specifically configured to:

perform deformable convolution processing on the first image by the first model, so as to obtain image feature information; and perform processing on the image feature information by the first model to obtain the at least one human body image and the at least one head image.

In a possible design, the determining module is further specifically configured to:

acquire matching degree between the area where the at least one head image is located and the area where each human body image is located; and determine the human body image corresponding to each head image in the at least one human body image according to the matching degree corresponding to each head image.

In a possible design, for a first head image in the at least one head image, the determining module is further specifically configured to:

determine first matching degree in the matching degree corresponding to the first head image; and determine a human body image corresponding to the first matching degree to be the human body image corresponding to the first head image.

In a possible design, the determining module is further specifically configured to:

add a label in the first image according to a type of the first head image, where the label is used to indicate the human body image corresponding to the first head image;

where, the type of the first head image is a first type or a second type, the first type is used to indicate that the first head image includes a safety helmet image, and the second type is used to indicate that the first head image does not include the safety helmet image.

In a possible design, the determining module is further specifically configured to:

add a first label in the first image, when the type of the first head image is the first type; and/or add a second label in the first image, when the type of the first head image is the second type.

In a possible design, the apparatus further includes a sending module, where the sending module is configured to: after processing the human body image corresponding to the at least one head image according to a type of the at least one head image, send an alarm instruction to an alarm device, where the alarm instruction instructs the alarm device to perform an alarm operation.

In a possible design, the first image is an image collected by the camera device in a preset area.

According to a third aspect of the present application, an electronic device is provided, which includes:

at least one processor; and a memory in communicational connection with the at least one processor; where, the memory stores instructions executable by the at least one processor, and the instructions are executed by the at least one processor to enable the at least one processor to perform the method according to any one of the above first aspect.

According to a fourth aspect of the present application, a non-transitory computer readable storage medium storing computer instructions is provided, where the computer instructions are used to cause the computer to perform the method according to any one of the above first aspect.

The technical solution according to the present application solves the problem of wasting the manpower of the monitoring staffs caused by relying on the monitoring staffs to observe the construction video images to determine whether the constructors are wearing safety helmets, in the prior art. Furthermore, it solves the problem: when the monitoring staffs observe the construction images, some of the construction images may be missed, resulting in poor effectiveness of monitoring. The accuracy of the method for detecting wearing of a safety helmet is improved, missed detection or error detection is avoided, and the manpower is saved.

It should be noted that contents described in this section are not intended to identify key or important features of the embodiments of the present application, nor are they intended to limit the scope of the present application. Other features of the present application will be easily understood through the following description.

BRIEF DESCRIPTION OF THE DRAWINGS

The drawings are used to better understand the present solution and do not limit the present application. Where.

DESCRIPTION OF EMBODIMENTS

Exemplary embodiments of the present application will be illustrated below with reference to the drawings, which include various details of the embodiments of the present application to facilitate understanding, and they should be considered merely exemplary. Therefore, those of ordinary skilled in the art shall understand that various changes and modifications of the embodiments described herein can be made without departing from the scope and spirit of the present application. Likewise, for clarity and conciseness, descriptions of well-known functions and structures are omitted in the following description.

The terms "first", "second", "third" and "fourth", etc. (if any) in the description and/or claims and the above drawings of the present application are used to distinguish from similar objects, and they do not have to be used to describe a specific order or sequence. In addition, the terms "include" and "have" and any variations thereof are intended to cover non-exclusive inclusion, for example, a process, a method, a system, a product, or a device including a series of steps or units does not have to be limited to those steps or units listed explicitly, but may include other steps or units that are not explicitly listed or are inherent to the process, the method, the product, or the device.

Figure 1:
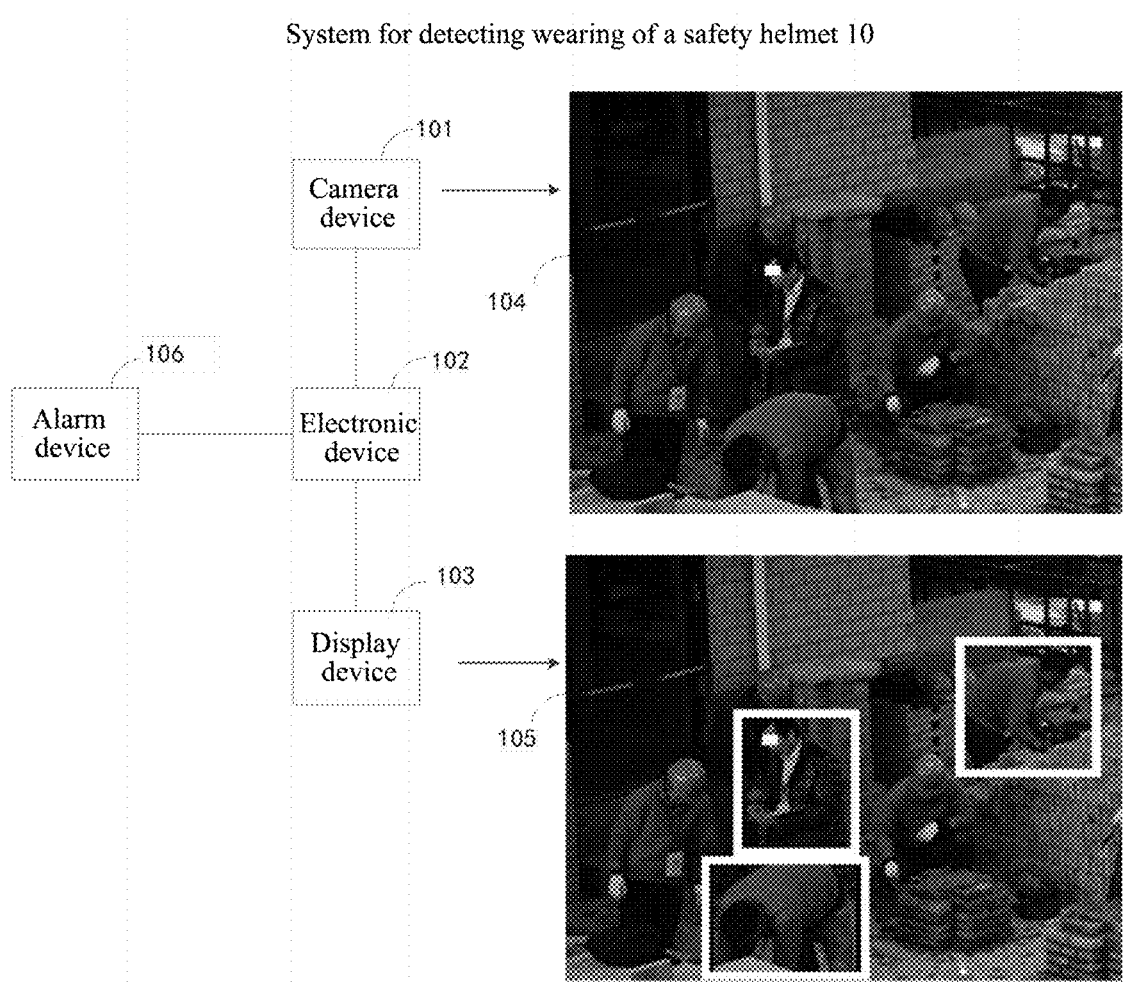
FIG. 1 is a schematic diagram of an application scenario of a method for detecting wearing of a safety helmet provided by the present application.

FIG. 1 is a schematic diagram of an application scenario of a method for detecting wearing of a safety helmet provided by the present application. As shown in FIG. 1, a system for detecting wearing of a safety helmet 10 includes: a camera device 101, an electronic device 102, a display device 103 and an alarm device 106, where, the electronic device 102 is in communicational connection with the camera device 101, the display device 103 and the alarm device 106, respectively.

When the electronic device 102 communicates with the camera device 101, the display device 103 and the alarm device 106, the camera device 101 can collect images of a construction area in real time to obtain a first image 104; and the electronic device 102 can process the first image 104 to determine a human body image and a head image in the first image 104 and determine the human body image corresponding to the head image, and then process the human body image corresponding to the head image according to a type of a head image to determine a human body image without wearing a safety helmet. A second image 105 is displayed by the display device 103, and in the second image 105, the human body image without wearing a safety helmet in the first image 104 is selected. In the above process, the electronic device 102 determines the human body image corresponding to the head image, so that the accuracy of detection of wearing of a safety helmet can be improved. Additionally, the electronic device 102 processes the human body image corresponding to the head image according to the type of the head image, so that supervisors can easily find constructors who are not wearing safety helmets, avoiding problems of missing camera images due to visual fatigue of the supervisors caused by necessity to observe the display device 103 at all times and the enabling to remind the constructors in time, thereby saving supervision labor and improving monitoring accuracy.

Alternatively, after determining the human body image without wearing a safety helmet, the electronic device 102 can send an alarm instruction to an alarm device 106 to cause the alarm device 106 to perform an alarm operation. During the alarm operation performed by the alarm device 106, the supervisors can be reminded to urge the constructors to wear safety helmets, thereby improving the effectiveness of construction monitoring and the safety of the constructors.

Hereinafter, the technical solutions shown in the present application will be described in detail through specific embodiments. It should be noted that the following specific embodiments can be combined with each other, and the same or similar contents will not be repeated in different embodiments.

Figure 2:
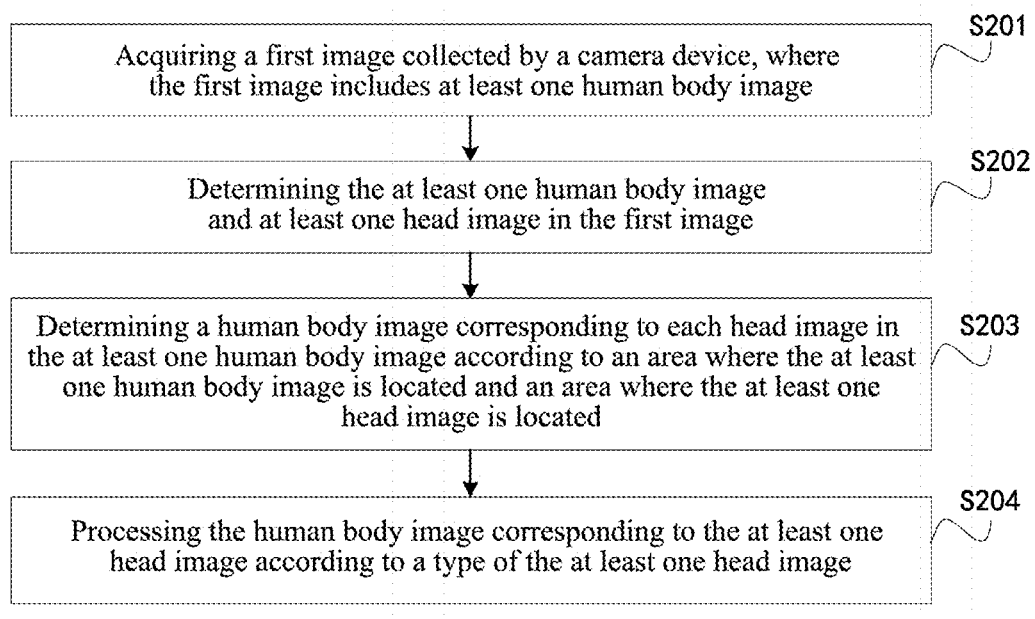
FIG. 2 is a schematic flowchart of a method for detecting wearing of a safety helmet provided by the present application.

FIG. 2 is a schematic flowchart of a method for detecting wearing of a safety helmet provided by the present application. As shown in FIG. 2, the method for detecting wearing of a safety helmet provided by the present embodiment includes:

S201: acquiring a first image collected by a camera device, where the first image includes at least one human body image.

Alternatively, an execution subject of the embodiment of the present application is an electronic device, and may also be an apparatus for detecting wearing of a safety helmet in the electronic device. Where the apparatus for detecting wearing of a safety helmet can be implemented by a combination of software and/or hardware.

Alternatively, the camera device is a surveillance camera that can be in communicational connection with the electronic device. For example, the surveillance camera can be any one of a wide-angle lens, a standard lens, a telephoto lens, a zoom lens, etc.

Alternatively, the first image is an image collected by the camera device in a preset area, where the preset area is an area where the first image can be collected.

Alternatively, the first image collected by the camera device can be acquired every a preset time interval, or the first image collected by the camera device can be acquired in real time. Where the preset time interval can be 2 seconds, 3 seconds, etc.

S202: determining the at least one human body image and at least one head image in the first image.

Alternatively, the first image can be processed by an image recognition algorithm, so as to determine at least one human body image and at least one head image.

Alternatively, the first image can be processed by a first model, so as to determine at least one human body image and at least one head image. Where the first model is obtained by learning a plurality of sets of samples, and each set of samples includes a sample image, a sample human body image and a sample head image.

In practical application, in order to obtain the above first model, the sample image is usually labelled after the sample image is collected, so as to obtain a sample human body image and a sample head image in the sample image. Furthermore, a Cascade R-Convolutional Neural Network (Cascade R-Convolutional Neural Network, Cascade R-CNN) model is trained through the sample image, the labelled sample human body image and sample head image to obtain the first model.

Figure 3:
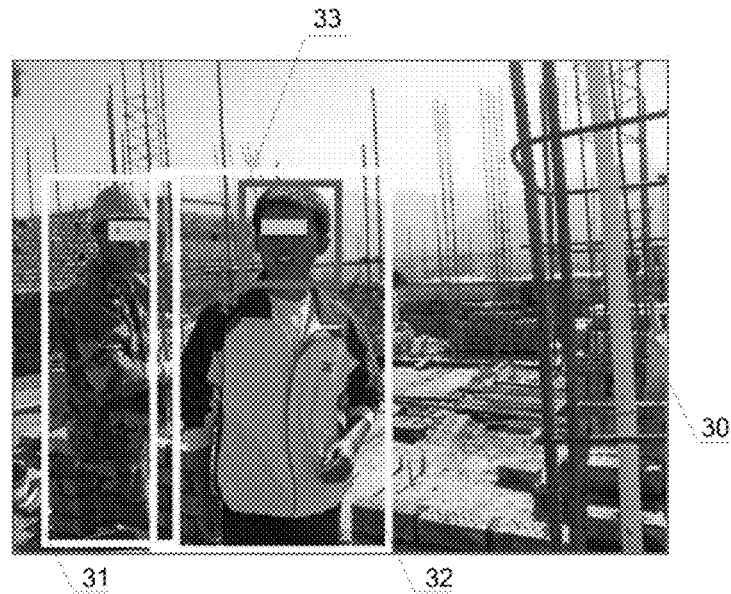
FIG. 3 is a labelling schematic diagram provided by the present application.

Hereafter, a sample head image including a head image without wearing a safety helmet is taken as an example to illustrate a labelling diagram. FIG. 3 is a labelling schematic diagram provided by the present application. As shown in FIG. 3, a sample image 30 includes: sample human body images 31 and 32, and a sample head image 33. Where the sample human body images 31 and 32 are labelled with the same labelling format, and the sample head image 33 is labelled with a different labelling format from that of the sample human body image 31.

Figure 4:
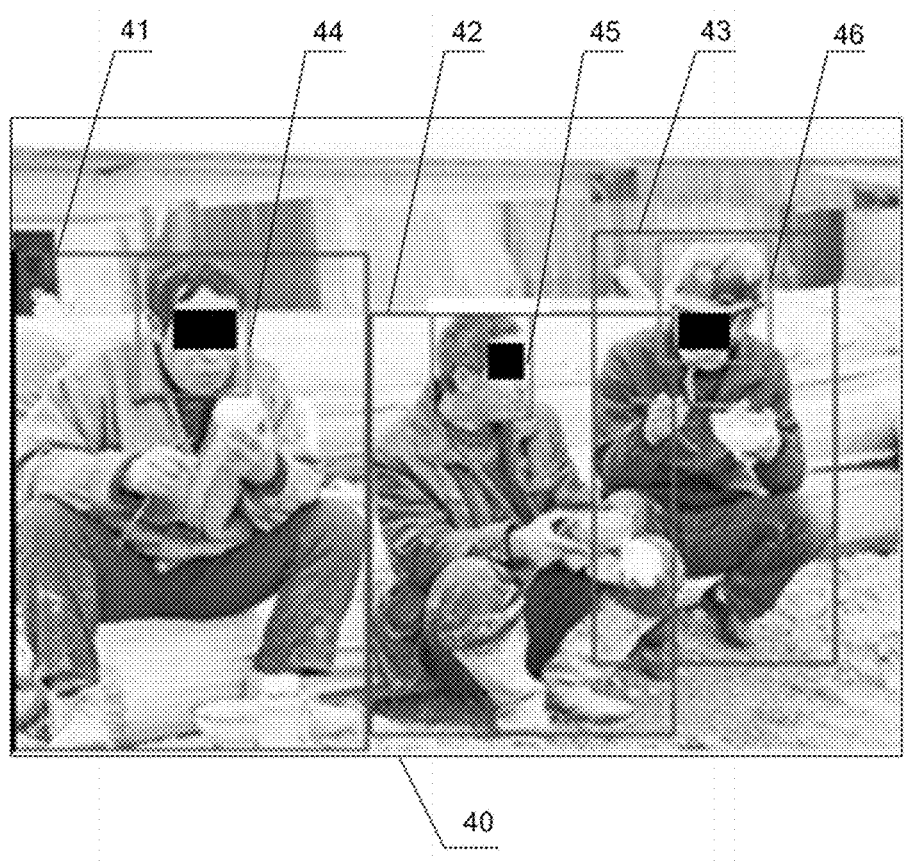
FIG. 4 is another labelling schematic diagram provided by the present application.

Hereafter, a sample head image including a head image wearing a safety helmet and a head image without wearing a safety helmet is taken as an example to illustrate another labelling diagram. FIG. 4 is another labelling schematic diagram provided by the present application. As shown in FIG. 4, a sample image 40 includes: sample human body images 41, 42 and 43, and sample head images 44, 45 and 46. Where the sample human body images 41, 42 and 43 are labelled with the same labelling format, the sample head images 44 and 45 are labelled with different labelling formats from that of the sample human body image 41, and the sample head image 46 can be labelled with different labelling format from those of the sample head image 44 and the sample human body image 41.

S203: determining a human body image corresponding to each head image in the at least one human body image according to an area where the at least one human body image is located and an area where the at least one head image is located.

In practice, an area where a head image is located and an area where a human body image is located usually meet the following rules: (1) the area where a head image is located is within the area where a corresponding human body image is located; and (2) the area where the head image is located is in an upper part of the area where the corresponding human body image is located. Therefore, according to the above (1) and (2), the area where a human body image is located and the area where a head image is located can be matched to determine the human body image corresponding to each head image.

Different from the prior art, in the prior art, each human body image in monitoring images is subjected to recognition and detection of a safety helmet, so as to determine whether there is a safety helmet in each human body image, in this case, when a constructor is holding or carrying a safety helmet, it may be misjudged that the constructor is wearing a safety helmet on the head, which reduces the accuracy of a method for detecting wearing of a safety helmet. However, in the present application, the determining the human body image corresponding to each head image in the at least one human body image can cause the head image to match the human body image, avoiding misjudgment of a constructor wearing a safety helmet on the head when the constructor is holding or carrying a safety helmet, thereby improving the accuracy of a method for detecting wearing of a safety helmet.

S204: processing the human body image corresponding to the at least one head image according to a type of the at least one head image.

Alternatively, the type of the head image can be a first type or a second type. In that case, the first type is used to indicate that the head image includes a safety helmet image, and the second type is used to indicate that the head image does not include a safety helmet image.

For example, when the type of the head image is the first type, the human body image corresponding to the head image can be labelled through a first labelling box (e.g., a blue solid box).

For example, when the type of the head image is the second type, the human body image corresponding to the head image can be labelled through a second labelling box (e.g., a red solid box).

The method for detecting wearing of a safety helmet provided by the present embodiment includes: acquiring a first image collected by a camera device, where the first image includes at least one human body image; determining the at least one human body image and at least one head image in the first image; determining a human body image corresponding to each head image in the at least one human body image according to an area where the at least one human body image is located and an area where the at least one head image is located; and processing the human body image corresponding to the at least one head image according to a type of the at least one head image. In the above method, the determining the human body image corresponding to each head image in the at least one human body image avoids misjudgment of a constructor wearing a safety helmet on the head when the constructor is holding or carrying a safety helmet, thereby improving the accuracy of a method for detecting wearing of a safety helmet, and avoiding missed detection or error detection. Furthermore, the processing the human body image corresponding to the at least one head image according to a type of the at least one head image can save labor and improve monitoring accuracy.

On the basis of the above embodiment, the method for detecting wearing of a safety helmet provided by the present application will be further described in detail below with reference to FIG. 5. For details, please refer to the embodiment of FIG. 5.

Figure 5:
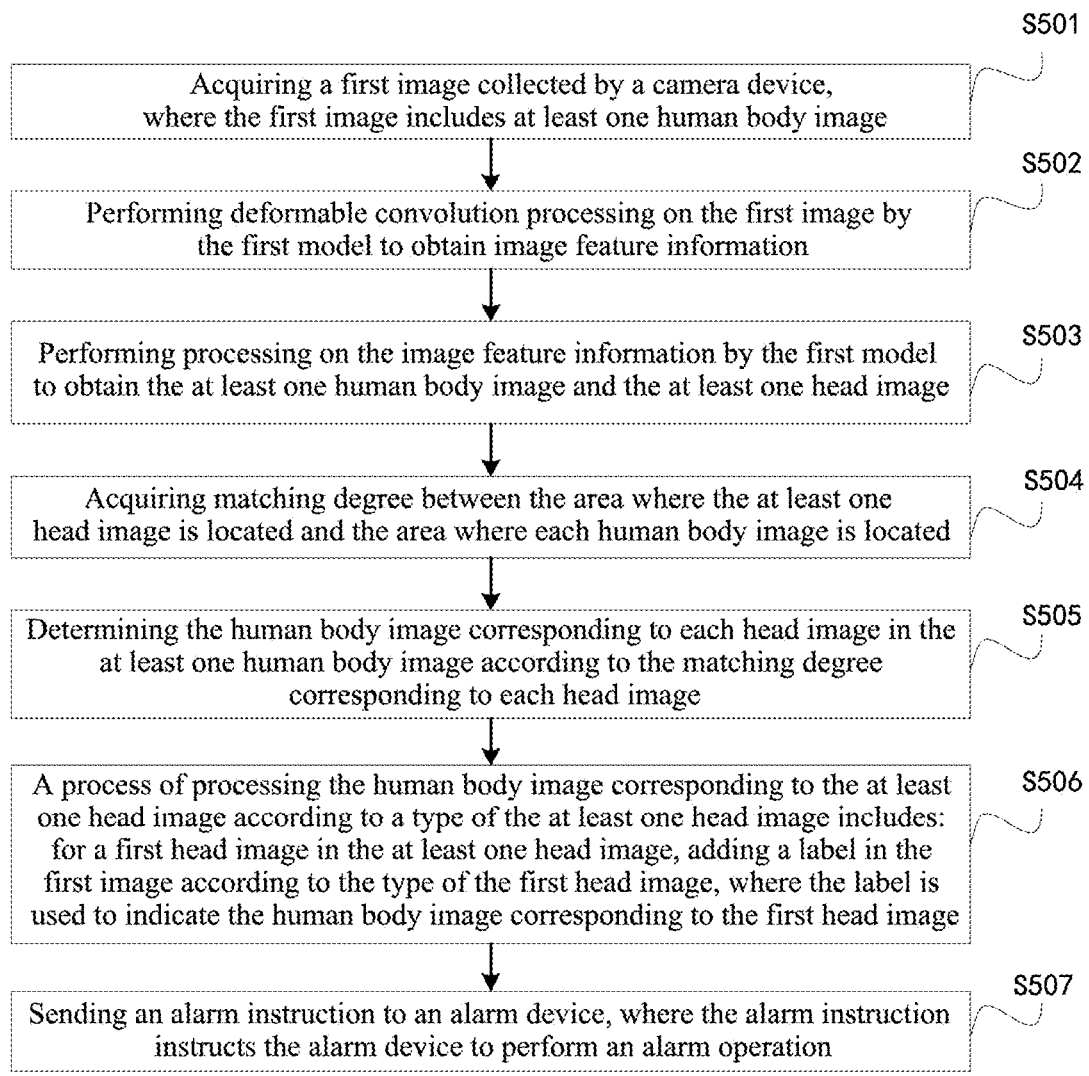
FIG. 5 is another schematic flowchart of a method for detecting wearing of a safety helmet provided by the present application.

FIG. 5 is another schematic flowchart of a method for detecting wearing of a safety helmet provided by the present application. As shown in FIG. 5, the method for detecting wearing of a safety helmet provided by the present embodiment includes:

S501: acquiring a first image collected by a camera device, where the first image includes at least one human body image.

Specifically, the implementation method of S501 is the same as that of S201, which will not be repeated herein.

S502: performing deformable convolution processing on the first image by the first model to obtain image feature information.

S503: performing processing on the image feature information by the first model to obtain the at least one human body image and the at least one head image.

Figure 7:
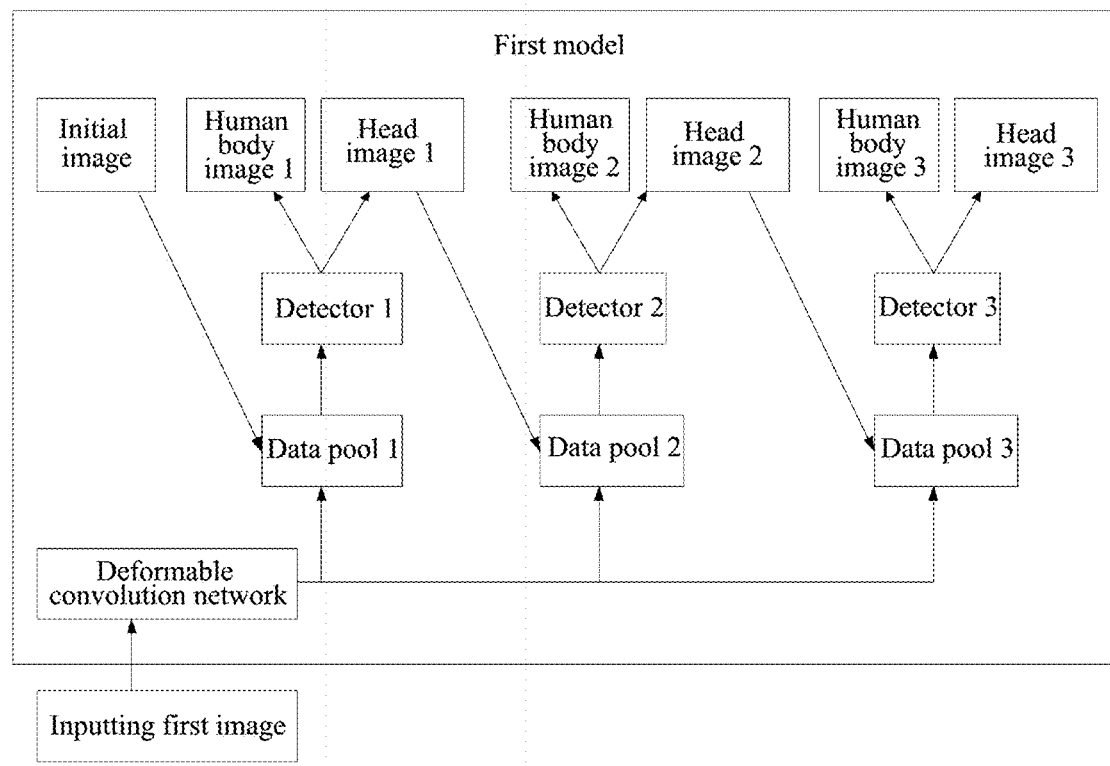
FIG. 7 is a structural schematic diagram of a first model provided by the present application.

Specifically, for detailed description of S502 and S503, please refer to the embodiment of FIG. 7, which will not be repeated herein.

S504: acquiring matching degree between the area where the at least one head image is located and the area where each human body image is located.

Where the matching degree can be overlapping degree between the area where the head image is located and the area where the human body image is located.

For example, when the overlapping degree is 100%, it can indicate that the area where the head image is located is within the area where the human body image is located.

For example, when the overlapping degree is 0, it can indicate that the area where the head image is located is outside the area where the human body image is located.

For example, when the overlapping degree is 50%, it can indicate that the area where the head image is located has a 50% overlap with the area where the human body image is located.

S505: determining the human body image corresponding to each head image in the at least one human body image according to the matching degree corresponding to each head image.

In a possible design, for a first head image in the at least one head image, determining of a human body image corresponding to the first head image in the at least one human body image according to matching degree corresponding to the first head image, which includes:

determining first matching degree in the matching degree corresponding to the first head image; and determining a human body image corresponding to the first matching degree to be the human body image corresponding to the first head image.

Alternatively, the first matching degree is a maximum value of the matching degree corresponding to the first head image.

For example, the matching degree between the area where the first head image is located and an area where a first human body image is located is 25%, the matching degree between the area where the first head image is located and an area where a second human body image is located is 100%, and the matching degree between the area where the first head image is located and an area where a third human body image is located is 0. It can be determined that the first matching degree is 100%, that is, the human body image corresponding to the first head image is the second human body image.

Furthermore, after obtaining the overlapping degree between the area where the first head image is located and the area where each human body image is located, if it is determined that a first overlapping degree and a second overlapping degree are the same, based on a position of the area where the first head image is located in the area where the first human body image (the human body image corresponding to the first overlapping degree) is located, and a position of the area where the first head image is located in the area where the second human body image (the human body image corresponding to the second overlapping degree) is located, the human body image can be determined to be the first human body image or the second human body image.

For example, if the area where the first head image is located is in a middle part of the area where the first human body image is located and the area where the first head image is located is in an upper part of the area where the second human body image is located, the human body image corresponding to the first head image can be determined to be the second human body image.

In practice, the area where the human body image is located can be divided into multiple parts (e.g., a lower part, a middle part, an upper part, etc.) according to actual needs, so as to determine a position of an area where a target head image is located in the area where the human body image is located.

S506: a process of processing the human body image corresponding to the at least one head image according to a type of the at least one head image includes: for a first head image in the at least one head image, adding a label in the first image according to the type of the first head image, where the label is used to indicate the human body image corresponding to the first head image.

Where the type of the first head image is a first type or a second type, where the first type is used to indicate that the first head image includes a safety helmet image, and the second type is used to indicate that the first head image does not include a safety helmet image.

In a possible design, the adding a label in the first image according to the type of the first head image includes: adding a first label in the first image, if the type of the first head image is the first type; and/or, adding a second label in the first image, if the type of the first head image is the second type.

Alternatively, the above label can include shape, line type and/or color of a labeling frame. Alternatively, the shape can be square, round, etc. Alternatively, the line type can be a dashed line, a solid line, a dot-dash line, etc. Alternatively, the color can be red, yellow, green, blue, etc.

For example, the first label can be square, solid lines and blue, and the second label can be square, solid lines and red.

Alternatively, when the type of the first head image is the first type, the first label can be added to the area where the human body image corresponding to the first head image is located; and when the type of the first head image is the second type, the second label can be added to the area where the human body image corresponding to the first head image is located.

Figure 6:
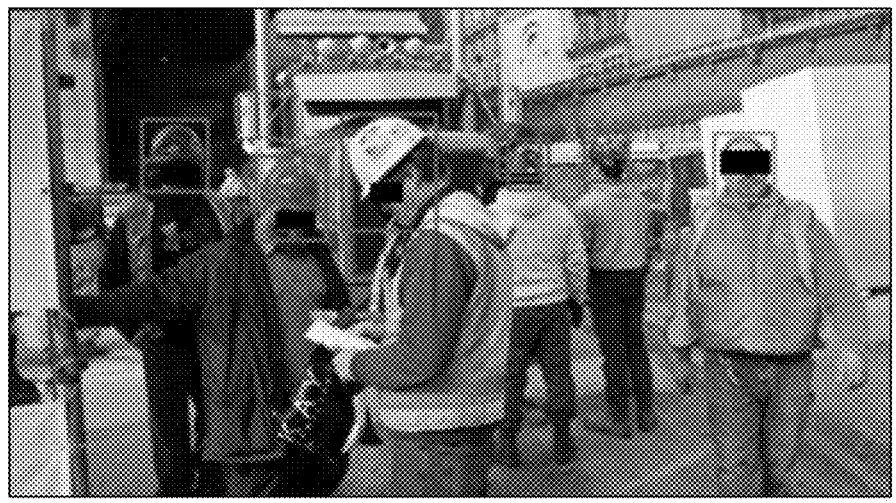
FIG. 6 is a schematic diagram of a first image after adding a label in a first head image provided by the present application.

Alternatively, when the type of the first head image is the first type, the first label can further be added to the area where the first head image is located; and when the type of the first head image is the second type, the second label can further be added to the area where the first head image is located, as shown in FIG. 6. FIG. 6 is a schematic diagram of a first image after adding a label in a first head image provided by the present application.

S507: sending an alarm instruction to an alarm device, where the alarm instruction instructs the alarm device to perform an alarm operation.

Alternatively, if the type of the first head image is the second type, an alarm instruction can be sent to the alarm device, where the alarm instruction instructs the alarm device to perform an alarm operation.

Alternatively, the alarm device can be a reminder device carried by the supervisors. For example, it can be a mobile phone, an interphone, etc. During the alarm operation performed by the alarm device, the constructors can be reminded to wear safety helmets.

Alternatively, after determining the human body image corresponding to each head image, the number of head images with the second type can also be counted. When the number is greater than or equal to a preset threshold, a shutdown instruction can be sent to the alarm device, where, the shutdown instruction is used to cause the alarm device to remind the supervisors to train the constructors to wear safety helmets and so on. Alternatively, the preset threshold can be 5, 6, etc.

Furthermore, an electronic device can also record the above number, so that when the supervisor is making a work report, the above number can be obtained through other devices for the work report.

The method for detecting wearing of a safety helmet provided by the present embodiment includes: acquiring a first image collected by a camera device, where the first image includes at least one human body image; performing deformable convolution processing on the first image by a first model to obtain image feature information; performing processing on the image feature information by the first model to obtain the at least one human body image and the at least one head image; acquiring matching degree between the area where the at least one head image is located and the area where each human body image is located; determining the human body image corresponding to each head image in the at least one human body image according to the matching degree corresponding to each head image; a process of processing the human body image corresponding to the at least one head image according to a type of the at least one head image includes: for a first head image in the at least one head image, adding a label in the first image according to the type of the first head image, where the label is used to indicate the human body image corresponding to the first head image; and sending an alarm instruction to an alarm device, where the alarm instruction instructs the alarm device to perform an alarm operation. In the above method, the performing deformable convolution processing on the first image by a first model to obtain image feature information improves the robustness of the method for detecting wearing of a safety helmet with respect to image deformation, and, the obtaining the at least one human body image and the at least one head image by the first model can improve the accuracy of determining human body images and head images. Furthermore, it can improve the accuracy of a method for detecting wearing of a safety helmet and avoid missed detection or error detection the by determining the human body image and the head image in the first image, and then by determining the human body image corresponding to each head image in at least one human body image according to the matching degree corresponding to each first head image.

With reference to FIG. 7, taking a first model including 3 stage detectors as an example, a process of performing S502 to S503 by a first model will be described.

FIG. 7 is a structural schematic diagram of a first model provided by the present application. As shown in FIG. 7, the first model includes a deformable convolution (Deformable Convolution) network. The deformable convolution network can perform deformable convolution processing on the first image to obtain image feature information, and supply the image feature information to a data pool 1, a data pool 2 and a data pool 3, respectively.

The data pool 1 supplies image feature information and an initial image to a detector 1, and processes the image feature information and the initial image to obtain a human body image 1 and a head image 1, where the human body image 1 and the head image 1 are generally rough images.

The data pool 2 supplies image feature information and the head image 1 to a detector 2, and processes the image feature information and the head image 1 to obtain a human body image 2 and a head image 2, where the human body image 2 and the head image 2 are generally rough images.

The data pool 3 supplies image feature information and the head image 2 to a detector 3, and processes the image feature information and the head image 2 to obtain a human body image 3 and a head image 3, where the human body image 3 is the human body image in S503, and the head image 3 is the head image in S503.

It should be noted that the initial image is a preset image, where, the initial image, the human body image 1, the head image 1, the human body image 2, the head image 2, the human body image 3, and the head image 3 generally include area information in the first image.

Specifically, in the present application, the process of deformable convolution processing on the first image by the deformable convolution network is no longer described in detail.

In practice, in the process of training the first model through a plurality of sets of samples, smooth L1 loss (smooth L1 loss) is usually used to regress the position of a detection frame, and the classification is achieved through cross entropy loss (Cross Entropy Loss). After the first model is trained to convergence, the first model is deployed to an electronic device, so that the electronic device can perform the method for detecting wearing of a safety helmet provided by the present application.

Figure 8:
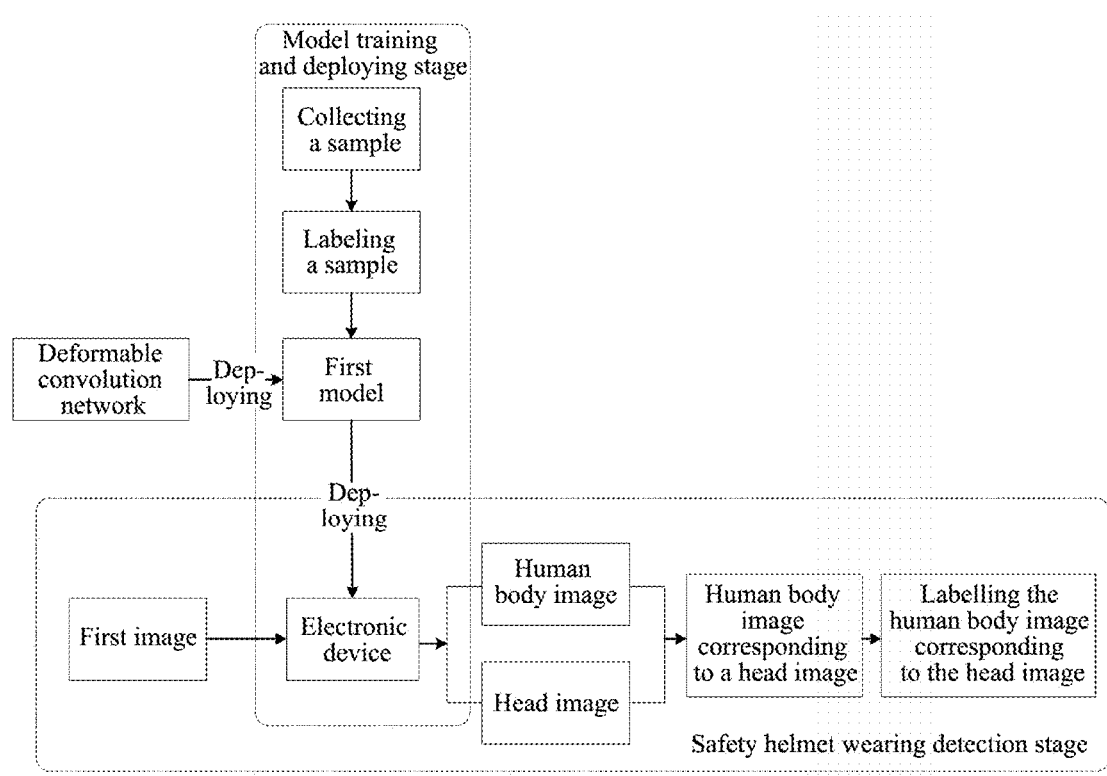
FIG. 8 is a design flowchart of a method for detecting wearing of a safety helmet provided by the present application.

FIG. 8 is a design flowchart of a method for detecting wearing of a safety helmet provided by the present application. As shown in FIG. 8, it includes a model training and deploying stage and a safety helmet wearing detection stage.

Where the model training and deploying stage includes: collecting a sample, labeling a sample, deploying the deformable convolution network to the model, obtaining the first model by the labelled sample training model, and deploying the first model to the electronic device.

Where the safety helmet wearing detection stage includes: the electronic device acquires the first image, detects the first image to determine at least one human body image and at least one head image, determines the human body image corresponding to each head image in at least one human body image, and labels the human body image corresponding to the head image (or labels the head image).

Figure 9:
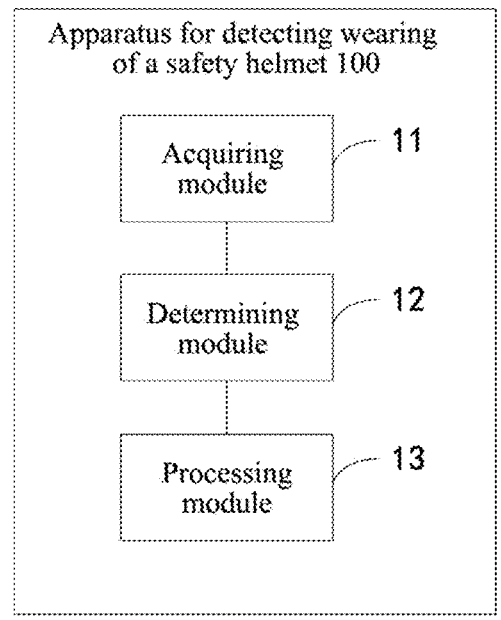
FIG. 9 is a structural schematic diagram of an apparatus for detecting wearing of a safety helmet provided by the present application.

FIG. 9 is a structural schematic diagram of an apparatus for detecting wearing of a safety helmet provided by the present application. As shown in FIG. 9, the apparatus for detecting wearing of a safety helmet 100 includes: an acquiring module 11, a determining module 12 and a processing module 13; where, the acquiring module 11 is configured to acquire a first image collected by a camera device, where the first image includes at least one human body image;

the determining module 12 is configured to determine at least one human body image and at least one head image in the first image;

the determining module 12 is further configured to determine a human body image corresponding to each head image in the at least one human body image according to an area where the at least one human body image is located and an area where the at least one head image is located; and the processing module 13 is configured to process the human body image corresponding to the at least one head image according to a type of the at least one head image.

The apparatus for detecting wearing of a safety helmet 10 provided by the embodiment of the present application can perform the technical solution of the above method embodiments, and the implementation principle and beneficial effect thereof are similar, which will not be repeated herein.

Figure 10:
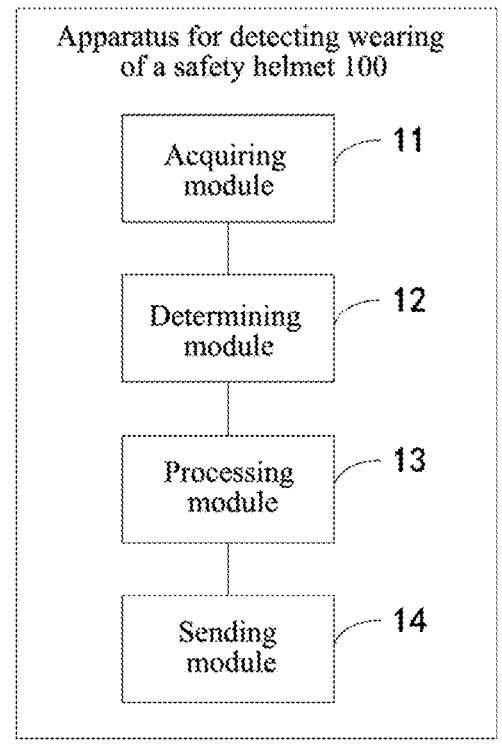
FIG. 10 is another structural schematic diagram of an apparatus for detecting wearing of a safety helmet provided by the present application.

FIG. 10 is another structural schematic diagram of an apparatus for detecting wearing of a safety helmet provided by the present application. As shown in FIG. 10, the apparatus for detecting wearing of a safety helmet 100 further includes a sending module 14, where the sending module 14 is configured to: after the human body image corresponding to the at least one head image is processed according to a type of the at least one head image, send an alarm instruction to an alarm device, where the alarm instruction instructs the alarm device to perform an alarm operation.

The apparatus for detecting wearing of a safety helmet 100 provided by the embodiment of the present application can perform the technical solution of the above method embodiments, and the implementation principle and beneficial effect thereof are similar, which will not be repeated herein.

In a possible design, the determining module 12 is specifically configured to:

process the first image by a first model to obtain the at least one human body image and the at least one head image, where the first model is obtained by learning a plurality of sets of samples, and each set of samples includes a sample image, a sample human body image and a sample head image.

In a possible design, the determining module 12 is specifically configured to:

perform deformable convolution processing on the first image by the first model, so as to obtain image feature information; and perform processing on the image feature information by the first model to obtain the at least one human body image and the at least one head image.

In a possible design, the determining module 12 is further specifically configured to:

acquire matching degree between the area where the at least one head image is located and the area where each human body image is located; and determine the human body image corresponding to each head image in the at least one human body image according to the matching degree corresponding to each head image.

In a possible design, for a first head image in the at least one head image, the determining module 12 is further specifically configured to:

determine first matching degree in the matching degree corresponding to the first head image; and determine a human body image corresponding to the first matching degree to be the human body image corresponding to the first head image.

In a possible design, the determining module 12 is further specifically configured to:

add a label in the first image according to a type of the first head image, where the label is used to indicate the human body image corresponding to the first head image; and where, the type of the first head image is a first type or a second type, the first type is used to indicate that the first head image includes a safety helmet image, and the second type is used to indicate that the first head image does not include a safety helmet image.

In a possible design, the determining module 12 is further specifically configured to:

add a first label in the first image, if the type of the first head image is the first type; and/or, add a second label in the first image, if the type of the first head image is the second type.

In a possible design, the first image is an image collected by the camera device in a preset area.

Figure 11:
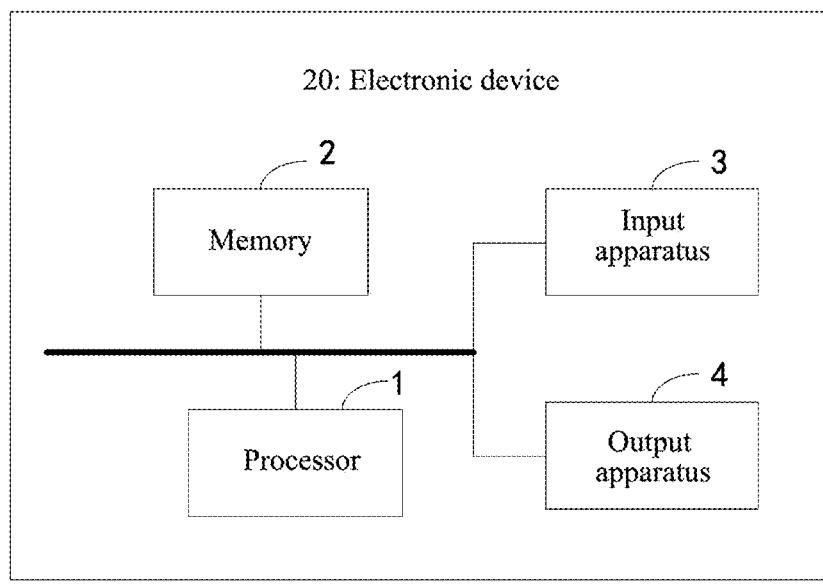
FIG. 11 is a block diagram of an electronic device for a method for detecting wearing of a safety helmet provided by the present application.

FIG. 11 is a block diagram of an electronic device for a method for detecting wearing of a safety helmet provided by the present application. The electronic device is intended to represent various forms of digital computers, such as laptop computers, desktop computers, workstations, personal digital assistants, servers, blade servers, mainframe computers, and other suitable computers. The electronic device can also represent various forms of mobile apparatuses, such as personal digital processors, cellular phones, smart phones, wearable devices and other similar computing apparatuses. The components, their connections and relationships, and their functions shown herein are merely examples, and are not intended to limit the implementation of the present application described and/or required herein.

As shown in FIG. 11, the electronic device 20 includes: one or more processors 1, a memory 2, and interfaces which include a high speed interface and a low speed interface for connecting various components. The various components are connected to each other by using different buses, and can be installed on a common mainboard or installed in other ways as required. The processor can process instructions executed in the electronic device, which includes instructions stored in or on the memory to display graphical information of a GUI on an external input/output apparatus (e.g., a display device coupled to the interface). In other embodiments, if necessary, a plurality of processors and/or a plurality of buses can be used with a plurality of memories. Similarly, a plurality of electronic devices can be connected, and each device provides some necessary operations (e.g., as a server array, a group of blade servers, or a multi-processor system). In FIG. 11, one processor 1 is taken as an example.

The memory 2 is a non-transitory computer readable storage medium provided by the present application. Where the memory stores instructions that can be executed by at least one processor, so that the at least one processor performs the method for detecting wearing of a safety helmet provided by the present application. The non-transitory computer readable storage medium according to the present application stores computer instructions, and the computer instructions are used to cause the computer to perform the method for detecting wearing of a safety helmet provided by the present application.

As a non-transitory computer readable storage medium, the memory 2 can be used to store non-transitory software programs, non-transitory computer executable programs and modules, such as program instructions/modules (e.g., the acquiring module 11, the determining module 12 and the processing module 13 shown in FIG. 9 and FIG. 10, and the sending module 14 shown in FIG. 10) corresponding to the methods for detecting wearing of a safety helmet in the embodiments of the present application. The processor 1 executes various function applications and data processing of the server by running non-transitory software programs, instructions and modules stored in the memory 2, that is, the by implementing the methods for detecting wearing of a safety helmet in the above method embodiments.

The memory 2 can include a program storage area and a data storage area, where the program storage area can store an operating system and an application program required by at least one function; and the data storage area can store data created by the use of the electronic device according to the method for detecting wearing of a safety helmet, etc. Additionally, the memory 2 can include a high-speed random access memory, and can also include a non-transitory memory, such as at least one magnetic disk storage component, a flash memory component, or other non-transitory solid-state storage components. In some embodiments, the memory 2 optionally includes memories remotely arranged with respect to the processor 1, and these remote memories can be connected to the electronic device for the method for detecting wearing of a safety helmet through a network. Examples of the above network include, but are not limited to, the Internet, an intranet, a local area network, a mobile communication network, and combinations thereof.

The electronic device 20 for the method for detecting wearing of a safety helmet can further include an input apparatus 3 and an output apparatus 4. The processor 1, the memory 2, the input apparatus 3, and the output apparatus 4 can be connected through a bus or in other ways. In FIG. 11, the connection through a bus is taken as an example.

The input device 3 can receive inputted number or character information, and generate signal input related to user settings and function control of the electronic device for the method for detecting wearing of a safety helmet, for example, a touch screen, a keypad, a mouse, a trackpad, a touchpad, a pointing stick, one or more mouse buttons, a trackball, a joystick and other input apparatuses. The output apparatus 4 can include a display device, an auxiliary lighting apparatus (e.g., LED), and a tactile feedback apparatus (e.g., a vibration motor), etc. The display device can include, but is not limited to, a liquid crystal display (LCD), a light emitting diode (LED) display, and a plasma display. In some embodiments, the display device can be a touch screen.

Various implementations of the systems and technologies described herein can be implemented in digital electronic circuit systems, integrated circuit systems, ASIC (application specific integrated circuit), computer hardware, firmware, software, and/or combinations thereof. These various implementations can include: implementations in one or more computer programs. The one or more computer programs can be executed and/or interpreted on a programmable system including at least one programmable processor, the programmable processor can be a dedicated or general programmable processor, which can receive data and instructions from a storage system, at least one input apparatus, and at least one output device, and transmit data and instructions to the storage system, the at least one input apparatus, and the at least one output apparatus.

These computer programs (also referred to as programs, software, software applications, or codes) include machine instructions of a programmable processor, and these computer programs can be implemented by using advanced procedures and/or object oriented programming languages, and/or assembly/machine languages. As used herein, the terms "machine readable medium" and "computer readable medium" refer to any computer program product, device, and/or apparatus (e.g., a magnetic disk, an optical disk, a memory, a programmable logic device (PLD)) used to supply machine instructions and/or data to a programmable processor, which includes a machine readable medium that receives a machine instruction as a machine readable signal. The term "machine readable signal" refers to any signal used to supply machine instructions and/or data to a programmable processor.

In order to provide interaction with a user, the systems and techniques described herein can be implemented in a computer, where the computer includes: a display apparatus (e.g., a CRT (cathode ray tube) or LCD (liquid crystal display) monitor) for displaying information to a user; and a keyboard and a guiding apparatus (e.g., a mouse or a trackball), where a user can provide the computer with input through the keyboard and the guiding apparatus. Other types of apparatuses can also be used to provide interaction with a user; for example, feedback provided to the user can be any form of sensory feedback (e.g., visual feedback, auditory feedback, or tactile feedback); and input from the user can be received in any form (including sound input, voice input, or tactile input).

The systems and techniques described herein can be implemented in a computing system (e.g., as a data server) including a back-end component, or a computing system (e.g., an application server) including a middleware component, or a computing system (e.g., a user's computer with a GUI or a web browser, where the user can interact with the implementations of the systems and techniques described herein through the GUI or the web browser) including a front-end component, or a computing system including any combination of such back-end component, middleware component and front-end component. The components of the system can be connected with each other through digital data communication (e.g., communication networks) in any form or medium. Examples of the communication networks include Local Area Network (LAN), Wide Area Network (WAN) and Internet.

The computer system can include a client and a server. The client and the server are generally remote from each other and typically interact through a communication network. The relation of the client and the server is generated by the computer programs running on corresponding computers and having a client-server relation to each other.

The following problems have been solved by the technical solutions according to the embodiments of the present application: when the monitoring staffs are relied on to observe the construction video images to determine whether the workers are wearing safety helmets, the manpower of the monitoring staffs would be wasted; furthermore, when the monitoring staffs observe the construction video images, some of the construction video images may be missed, resulting in poor effectiveness of construction monitoring. The accuracy of the method for detecting wearing of a safety helmet is improved, missed detection or error detection is avoided, and the manpower is saved.

It should be appreciated that various forms of processes shown above can be used to reorder, add, or delete steps. For example, the steps recorded in the present application can be performed in parallel or sequentially or in different orders, as long as the desired results of the technical solutions disclosed in the present application can be achieved, which is not limited herein.

The above specific implementations do not limit the protection scope of the present application. Those skilled in the art should understand that various modifications, combinations, sub-combinations and substitutions can be made based on the design requirements and other factors. Any modification, equivalent substitution, or improvement made within the spirit and principle of the present application shall be considered to be within the protection scope of the present application.

What is claimed is:

1. A method for detecting wearing of a safety helmet, comprising:
   acquiring a first image collected by a camera device, wherein the first image comprises at least one human body image;
   determining the at least one human body image and at least one head image in the first image;
   determining a human body image corresponding to each head image in the at least one human body image according to an area where the at least one human body image is located and an area where the at least one head image is located; and
   processing the human body image corresponding to the at least one head image according to a type of the at least one head image;
   wherein the determining a human body image corresponding to each head image in the at least one human body image according to an area where the at least one human body image is located and an area where the at least one head image is located comprises:
   acquiring matching degree between the area where the at least one head image is located and the area where each human body image is located; and
   determining the human body image corresponding to each head image in the at least one human body image according to the matching degree corresponding to each head image;
   wherein for a first head image in the at least one head image, determining a human body image corresponding to the first head image in the at least one human body image according to matching degree corresponding to the first head image, comprising:
   determining first matching degree in the matching degrees corresponding to the first head image, wherein the first matching degree is a maximum matching degree among the matching degrees corresponding to the first head image; and
   when the first matching degree is different from the remaining matching degrees corresponding to the first head image, determining the human body image corresponding to the first matching degree as the human body image corresponding to the first head image;

when the first matching degree is the same as second matching degree, determining the human body image corresponding to the first head image from a first human body image and a second human body image, based on a position of a first area in a second area and a position of the first area in a third area, wherein the first area is an area where the first head image is located, the second area is an area where the first human body image is located, the third area is an area where the second human body image is located; wherein the first human body image is the human body image corresponding to the first matching degree, and the second human body image is the human body image corresponding to the second matching degree.

2. The method according to claim 1, wherein the determining the at least one human body image and at least one head image in the first image comprises:

processing the first image by a first model to obtain the at least one human body image and the at least one head image, wherein the first model is obtained by learning a plurality of sets of samples, and each set of samples comprises a sample image, a sample human body image and a sample head image.

3. The method according to claim 2, wherein the processing the first image by a first model to obtain the at least one human body image and the at least one head image comprise:

performing deformable convolution processing on the first image by the first model to obtain image feature information; and performing processing on the image feature information by the first model to obtain the at least one human body image and the at least one head image.

4. The method according to claim 1, wherein the method further comprises: processing the human body image corresponding to the first head image according to a type of the first head image, comprising:

adding a label in the first image according to the type of the first head image, wherein the label is used to indicate the human body image corresponding to the first head image;

wherein the type of the first head image is a first type or a second type, the first type is used to indicate that the first head image comprises a safety helmet image, and the second type is used to indicate that the first head image does not comprise the safety helmet image.

5. The method according to claim 4, wherein the adding a label in the first image according to the type of the first head image comprises:

adding a first label in the first image, when the type of the first head image is the first type; and/or adding a second label in the first image, when the type of the first head image is the second type.

6. The method according to claim 1, wherein, after the processing the human body image corresponding to the at least one head image according to a type of the at least one head image, the method further comprises:

sending an alarm instruction to an alarm device, wherein the alarm instruction instructs the alarm device to perform an alarm operation.

7. The method according to claim 1, wherein the first image is an image collected by the camera device in a preset area.

8. The method according to claim 1, wherein, after the processing the human body image corresponding to the at least one head image according to a type of the at least one head image, the method further comprises:

displaying the processed image of the human body through a display device.

9. The method according to claim 1, wherein, the determining the human body image corresponding to the first head image from a first human body image and a second human body image, based on a position of a first area in a second area and a position of the first area in a third area, comprises:

determining the human body image corresponding to the first head image to be the second human body image when the first area is in a middle part of the second area and the first area is in an upper part of the third area.

10. An apparatus for detecting wearing of a safety helmet, comprising: at least one processor and a memory in communicational connection with the at least one processor; wherein, the memory stores instructions executable by the at least one processor, and the instructions are executed by the at least one processor to cause the at least one processor to: acquire a first image collected by a camera device, wherein the first image comprises at least one human body image;

determine at least one human body image and at least one head image in the first image;

determine a human body image corresponding to each head image in the at least one human body image according to an area where the at least one human body image is located and an area where the at least one head image is located; and process the human body image corresponding to the at least one head image according to a type of the at least one head image;

wherein the instructions further cause the at least one processor to:

acquire matching degree between the area where the at least one head image is located and the area where each human body image is located; and determine the human body image corresponding to each head image in the at least one human body image according to the matching degree corresponding to each head image;

wherein, for a first head image in the at least one head image, the instructions further cause the at least one processor to:

determine first matching degree in the matching degrees corresponding to the first head image, wherein the first matching degree is a maximum matching degree among the matching degrees corresponding to the first head image; and when the first matching degree is different from the remaining matching degrees corresponding to the first head image, determine the human body image corresponding to the first matching degree as the human body image corresponding to the first head image;

when the first matching degree is the same as second matching degree, determine the human body image corresponding to the first head image from a first human body image and a second human body image, based on a position of a first area in a second area and a position of the first area in a third area, wherein the first area is an area where the first head image is located, the second area is an area where the first human body image is located, the third area is an area where the second human body image is located; wherein the first human body image is the human body image corresponding to the first matching degree, and the second human body image is the human body image corresponding to the second matching degree.

11. The apparatus according to claim 10, wherein the instructions further cause the at least one processor to:
process the first image by a first model to obtain the at least one human body image and the at least one head image, wherein the first model is obtained by learning a plurality of sets of samples, and each set of samples comprises a sample image, a sample human body image and a sample head image.

12. The apparatus according to claim 11, wherein the instructions further cause the at least one processor to:
perform deformable convolution processing on the first image by the first model to obtain image feature information; and
perform processing on the image feature information by the first model to obtain the at least one human body image and the at least one head image.

13. The apparatus according to claim 10, wherein the instructions further cause the at least one processor to:
add a label in the first image according to a type of the first head image, wherein the label is used to indicate the human body image corresponding to the first head image;
wherein the type of the first head image is a first type or a second type, the first type is used to indicate that the first head image comprises a safety helmet image, and the second type is used to indicate that the first head image does not comprise the safety helmet image.

14. The apparatus according to claim 13, wherein the instructions further cause the at least one processor to:
add a first label in the first image, when the type of the first head image is the first type; and/or
add a second label in the first image, when the type of the first head image is the second type.

15. The apparatus according to claim 10, wherein the instructions further cause the at least one processor to: after processing the human body image corresponding to the at least one head image according to a type of the at least one head image, send an alarm instruction to an alarm device, wherein the alarm instruction instructs the alarm device to perform an alarm operation.

16. The apparatus according to claim 10, wherein the first image is an image collected by the camera device in a preset area.

17. A non-transitory computer readable storage medium storing computer instructions, wherein the computer instructions are used to cause a computer to perform the method according to claim 1.

18. A non-transitory computer readable storage medium storing computer instructions, wherein the computer instructions are used to cause a computer to perform the method according to claim 2.

19. The apparatus according to claim 10, wherein the instructions further cause the at least one processor to:
display the processed image of the human body through the display device.

20. The apparatus according to claim 10, wherein the instructions further cause the at least one processor to:
determine the human body image corresponding to the first head image to be the second human body image when the first area is in a middle part of the second area and the first area is in an upper part of the third area.

* * * * *